United States Patent [19]
Ishizuka

[11] Patent Number: 5,862,181
[45] Date of Patent: Jan. 19, 1999

[54] TRANSMITTING RECEIVING APPARATUS

[75] Inventor: Seijiro Ishizuka, Tokyo, Japan

[73] Assignee: Sony Corporation, Tokyo, Japan

[21] Appl. No.: 561,857

[22] Filed: Nov. 22, 1995

[30]  Foreign Application Priority Data

Nov. 30, 1994 [JP] Japan .................................. 6-297510

[51] Int. Cl.⁶ .................................................. H04L 27/00
[52] U.S. Cl. ............................. 375/259; 455/78; 455/86; 375/219
[58] Field of Search ..................... 375/219, 222, 375/279, 283, 326, 330, 308, 242, 259, 262, 265, 270, 284, 285; 332/103; 329/300, 304; 455/403, 408, 73, 78, 82–84, 86; 370/34

[56]  References Cited

U.S. PATENT DOCUMENTS

| | | | |
|---|---|---|---|
| 4,777,653 | 10/1988 | Bonnerot et al. | 455/69 |
| 5,229,997 | 7/1993 | Hirata et al. | |
| 5,404,378 | 4/1995 | Kimura | 375/296 |
| 5,523,726 | 6/1996 | Kroeger et al. | 375/279 |
| 5,535,252 | 7/1996 | Kobayashi | 375/371 |

FOREIGN PATENT DOCUMENTS 0608086  7/1984  European Pat. Off. .......... H04B 1/40

*Primary Examiner*—Jason Chan
*Assistant Examiner*—Jean B. Corrielus
*Attorney, Agent, or Firm*—Jay H. Maioli

[57]  ABSTRACT

A transmitter-receiver can eliminate a distortion of a transmission signal by a simple arrangement. In a transmitter-receiver of a communication system wherein a transmission timing and a reception timing are different from each other, comparing circuits (6I, 6Q) compare a transmission signal, which is not yet amplified in a transmission-system circuit, and a reception signal in a reception-system circuit during a transmission timing period. Differences detected by the comparing circuits (6I, 6Q) are fed back to signal-compensators (5I, 5Q) inserted into the transmission-system circuit, thereby eliminating a distortion generated in a transmission signal of the transmission-system circuit.

1 Claim, 3 Drawing Sheets

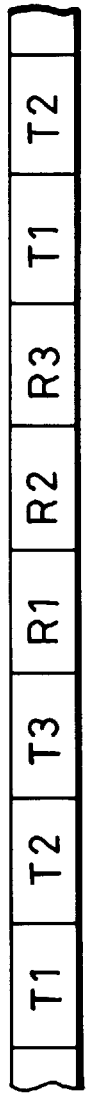
FIG. 1A
FIG. 1B

TRANSMITTING RECEIVING APPARATUS

BACKGROUND OF THE INVENTION

The present invention relates to a transmitting-receiving apparatus for use with a TDMA (time-division-multiple-access) system transmitter-receiver in which a transmission timing and a reception timing are different from each other.

In radio transmitter-receivers like a portable radiotelephone, a transmission signal, processed for transmission, is amplified by a transmission amplifier and supplied to a transmission antenna from which it is transmitted via radio waves. In order to enhance the receiving state of the transmission signal transmitted via radio waves on the reception side, the transmission signal should preferably be transmitted with a transmission power raised as high as possible by the transmission amplifier.

Further, in order to accurately demodulate the transmission signal on the reception side, it is important to prevent a distortion from being generated in the transmission signal when the transmission signal is amplified by the transmission amplifier as much as possible. In particular, when a phase-modulated signal is transmitted as a transmission signal, there is then the very large possibility that a distortion generated in the transmission signal will cause a bit error on the reception side. Therefore, it is very important to prevent the distortion from being generated in the transmission signal.

An amplifier called a class-A amplifier where transistors are operating permanently on linear portions of their transfer characteristics should preferably be used as the amplifier with minimum distortion.

Battery radio transmitter-receivers like a portable radiotelephone use a limited electric power for transmission processing. Therefore, from a standpoint of battery duration, the electric power used by the amplifier should be limited as much as possible.

Accordingly, use of the class-A amplifier is not preferable from a power consumption standpoint. Specifically, although the class-A amplifier has less distortion, it should be constantly energized even in the absence of a signal. Moreover, the class-A amplifier has a poor efficiency so that, if the transmission output level is raised, then the power consumption thereof is increased considerably.

An amplifier with high efficiency, e.g., the class-C amplifier should preferably be used in order to suppress a power consumption. The class-C amplifier is of the power-amplifier stage where bias of the amplifying element is adjusted so that the drive signal voltage produces output current for less than half of the total cycle. Thus, the class-C amplifier can amplify an input signal with a small electric power and can prove a satisfactory amplifying efficiency.

However, although the amplifying efficiency of the class-C amplifier is high, a distortion is generated in an amplified signal. Therefore, when the class-C amplifier is used as a transmission amplifier, it is necessary to provide a circuit for eliminating the distortion generated in the amplified signal. As the circuit for eliminating the distortion generated in the amplified signal, there is known the following circuit. More specifically, an output from the amplifier is detected by a detecting circuit and an error signal (i.e., distortion component) is detected from a detected signal and a detected distortion component is fed back to the amplified signal, thereby the distortion can be eliminated. If such distortion eliminating circuit is provided, then the transmission processing circuit becomes complicated.

SUMMARY OF THE INVENTION

In view of the aforesaid aspect, it is an object of the present invention to provide a transmitter-receiver in which a distortion generated in a transmission signal can be eliminated by a simple circuit arrangement even when an amplifier with high efficiency and much distortion, such as a class-C amplifier is used in a transmission circuit.

According to the present invention, there is provided a transmitting-receiving apparatus which is comprised of a control means, a data processing means controlled by the control means for processing transmitted data and received data so as to be communicated at different timings, a transmission-system circuit having an encoder for producing a transmission baseband signal from the transmitted data supplied thereto from the data processing means, a modulating means for producing a transmission signal from the transmission baseband signal, a power amplifier for amplifying the transmission signal, a reception-system circuit having a demodulating means for producing a reception baseband signal from a reception signal, a decoder for producing the reception data from the reception baseband signal, and a switch means controlled by the control means for selectively connecting the transmission-system circuit or the reception-system circuit to an antenna.

The transmitting-receiving apparatus further includes an error detecting means for detecting a difference between the transmission baseband signal and the reception baseband signal to provide an error signal and signal compensating means coupled between the encoder and the modulating means for adjusting the transmission baseband signal in response to the error signal supplied thereto from the error detecting means and wherein the reception-system circuit is constantly maintained in the operating state.

Therefore, the transmission signal containing the distortion generated in the power amplifier can be received by the reception-system circuit even during the transmission timing period. A difference between the reception baseband signal containing the distortion and the transmission baseband signal containing no distortion is fed back to the signal compensating means to thereby eliminate the distortion component from the transmission signal.

In the transmitting-receiving apparatus, the modulating means has a first oscillator for providing a frequency of the transmission signal, the demodulating means has a second oscillator for providing a frequency equal to a difference between the frequencies of the transmission signal and the reception signal, a first mixer for mixing an output supplied thereto from the first oscillator and an output supplied thereto from the second oscillator, a second mixer coupled between the switch means and the demodulating means, and a second switch means for switching to provide the output of the first oscillator to the second mixer when the switch means connects the transmission-system circuit to the antenna and for switching to provide an output of the first mixer to the second mixer when the switch means connects the reception-system circuit to said antenna.

Therefore, since the output frequencies of the second mixer become the same during both the transmission timing period and the reception timing period, circuits following the second mixer can constantly be operated properly.

BRIEF DESCRIPTION OF THE DRAWINGS

FIGS. 1A and 1B are explanatory diagrams showing a communication system to which the present invention is applied;

DETAILED DESCRIPTION OF THE PREFERRED EMBODIMENTS

Figure 2:
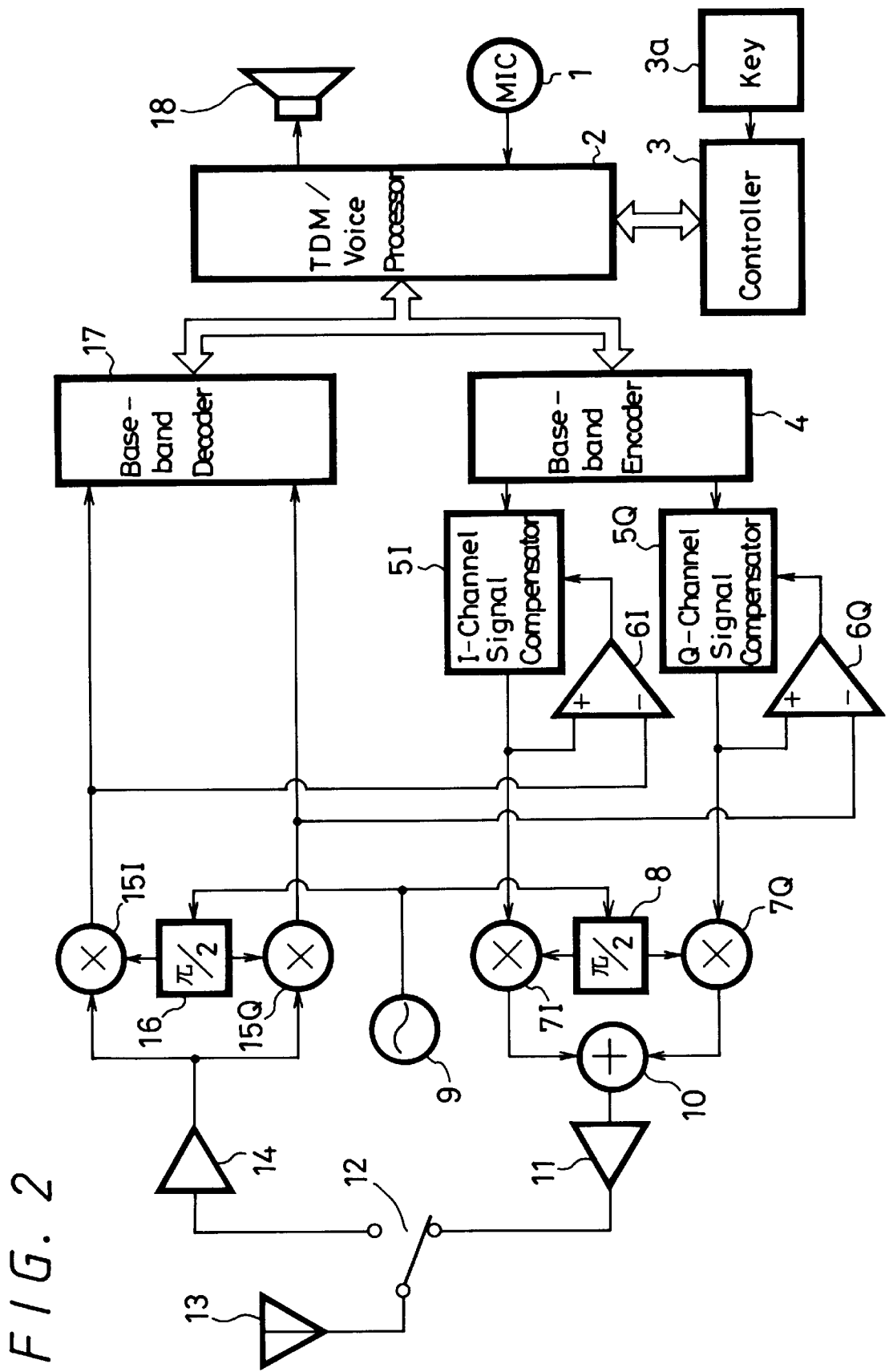
FIG. 2 is a block diagram showing a transmitter-receiver according to an embodiment of the present invention.

A transmitting-receiving apparatus according to an embodiment of the present invention will now be described with reference to FIGS. 1A, 1B and FIG. 2.

A transmitting-receiving apparatus according to the present invention is applied to a portable radiotelephone device (terminal equipment) of radiotelephone system for transmitting and receiving digital data between a base station and a remote station via radio waves. A communication system to which the radiotelephone system according to the present invention is applicable will be described with reference to FIGS. 1A and 1B.

In the communication system to which the present invention is applied, a transmission signal is data of one slot unit and transmitted at every slot. Transmission and reception are alternately carried out at every slot. As shown in FIG. 1A, data of one slot is transmitted from a base station to a remote station during a period of a transmission slot T and the data of one slot is received by the remote station. Data of one slot is transmitted from the remote station to the base station during a period of a reception slot R and the data of one slot is received by the base station. According to a time-division transmission system where a transmission timing and a reception timing are formed alternately, a transmission frequency and a reception frequency can be made the same and a channel can be used with high efficiency.

A communication system, which is often referred to as a TDMA (time-division-multiple-access) system, is known as an advanced communication system of the time-division transmission system. According to this communication system, as shown in FIG. 1B, three slots T1, T2, T3 are prepared as transmission slots and three slots R1, R2, R3 are prepared as reception slots. A combination of six slots is repeated. With this arrangement, the base station and three remote stations can simultaneously communicate with one another by use of six slots in one channel.

A signal is transmitted between the base station and a certain remote station (first remote station) by use of the transmission slot T1 and the reception slot R1. A signal is transmitted from the base station by use of the transmission slot T1 and a signal is received at the base station by use of the reception slot R1. Then, a signal is transmitted between the base station and the other remote station (second remote station) by use of the transmission slot T2 and the reception slot R2. A signal is transmitted from the base station by use of the transmission slot T2 and a signal is received at the base station by use of the reception slot R2. Further, a transmission between the base station and another remote station (third remote station) by use of the transmission slot T3 and the reception slot R3. A signal is transmitted from the base station by use of the transmission slot T3 and a signal is received at the base station by use of the reception slot R3.

The transmitter-receiver according to the present invention is arranged as the portable radiotelephone device serving as the remote station for communicating between it and the base station with different timings of the transmission slots and the reception slots in accordance with the time-division transmission system or TDMA system. FIG. 2 shows in block form the transmitter-receiver according to the present invention.

As shown in FIG. 2, a sound picked up at a microphone (MIC) 1 is supplied to a TDM (time-division multiplexing) /voice processor 2 as a voice signal and converted into digital voice data thereby. Simultaneously, voice data thus converted is compressed to transmission data to provide data of the slot arrangement. A processing in the TDM/voice processor 2 is carried out under control of a controller 3. The controller 3 is supplied with a command signal from an operation key 3a.

The data of the slot arrangement from the TDM/voice processor 2 is supplied to a baseband encoder 4. The baseband encoder 4 encodes bit data of slot unit supplied thereto to provide 2-channel transmission data of I channel and Q channel. The I-channel transmission data thus converted is supplied to an I-channel signal-compensator 5I, in which it is adjusted in amplitude based on an error signal supplied thereto from an error detector 6I, which will be described later on. The Q-channel data thus converted by the baseband encoder 4 is supplied to a Q-channel signal-compensator 5Q, in which it is adjusted in amplitude based on an error signal supplied thereto from an error detector 6Q, which will be described later on.

An output from the I-channel signal-compensator 5I is supplied to the error detector 6I and a mixer 7I. The mixer 7I is formed of a multiplier and other mixers are formed of like multipliers. A modulated output from the Q-channel signal-compensator 5Q is supplied to the error detector 6Q and a mixer 7Q.

An output from a $\pi/2$ phase-shifter 8 is supplied to the mixers 7I and 7Q, in which it is multiplied with I-channel and Q-channel transmission data whose amplitudes were adjusted. The $\pi/2$ phase-shifter 8 phase-shifts an oscillation output from an oscillator 9 by $\pi/2$. The mixer 7I multiplies the I-channel signal with the signal phase-shifted by $\pi/2$. Also, the mixer 7Q multiplies the Q-channel signal with the signal phase-shifted by $\pi/2$. The oscillation output from the oscillator 9 is an oscillation signal with a transmission frequency (e.g., 940 MHz). The I-channel signal and the Q-channel signal each being multiplied with the signal phase-shifted by $\pi/2$ are supplied to an adder 10 which generates a one-system signal, i.e., signal in which the I-channel signal and the Q-channel signal are orthogonally modulated with each other by the transmission frequency. A modulation system for orthogonally modulating the I-channel signal and the Q-channel signal is a phase-modulation system called a DQPSK (differential quadrature phase shift keying) modulation system.

The signal, which results from orthogonally modulating the I-channel signal and the Q-channel signal by the transmission frequency, from the adder 10 is supplied to and amplified by a transmission amplifier 11 to a predetermined output level. In this embodiment, a power amplifier formed of a class-C amplifier with satisfactory efficiency is used as the transmission amplifier 11. However, the class-C amplifier cannot obviate the drawback such that a distortion occurs in the amplified signal as described above.

An amplified output from the amplifier 11 is supplied through an antenna change-over switch 12 to an antenna 13 from which it is transmitted via radio waves. The antenna change-over switch 12 is changed-over so as to select a transmission-circuit system during the transmission slot period and to select a reception-circuit system during the reception slot period.

The transmission system will be described.

A radio signal received at the antenna 13 is supplied through the antenna change-over switch 12 to a reception amplifier 14, in which it is amplified. An amplifier with a small amplifying distortion, which is often referred to as a low-noise amplifier, is used as the reception amplifier 14. The reception amplifier 14 can be easily arranged as an amplifier with a small electric power and a small distortion as compared with the transmission amplifier 11.

An amplified output from the amplifier 14 is supplied to mixers 15I and 15Q, in which it is multiplied with an output from a $\pi/2$ phase-shifter 16. The $\pi/2$ phase-shifter 16 phase-shifts the oscillation output (940 MHz) of the oscillator 9 by $\pi/2$. Therefore, the mixer 15I multiplies the oscillation signal with the $\pi/2$-phase-shifted signal and the mixer 15Q multiplies the oscillation signal with the $\pi/2$-phase-shifted signal. With the above-mentioned multiplication, the I-channel signal and the Q-channel signal thus modulated by the frequency of 940 MHz are demodulated by the mixers 15I and 15Q.

The I-channel signal and the Q-channel signal thus demodulated are supplied to the baseband decoders 17 which decode the I-channel data and the Q-channel data to provide composite bit data of slot arrangement. The composite bit data of slot arrangement is supplied to the TDM/voice processor 2, in which voice data is extracted from the composite bit data under control of the controller 3. Then, the voice data thus extracted is converted into an analog audio signal and fed to a speaker 18, from which it is emanated as a sound.

The I-channel reception signal from the mixer 15I is supplied to the error detector 6I and the Q-channel reception signal from the mixer 15Q is supplied to the error detector 6Q. The error detector 6I detects a difference between the I-channel transmission signal and the I-channel reception signal. A detected difference from the error detector 6I is supplied to the signal-compensator 5I as an error signal, in which the I-channel transmission signal is adjusted in amplitude based on the difference. The error detector 5Q detects a difference between the Q-channel transmission signal and the Q-channel reception signal. A detected difference is supplied to the signal-compensator 5Q, in which the Q-channel transmission signal is adjusted in amplitude based on the difference.

In the communication system wherein the transmission timing and the reception timing are different, it is sufficient that the transmission-system circuit and the reception-system circuit are operated one after another. However, according to the present invention, during the transmission timing period, the reception amplifier 14, the mixers 15I, 15Q and the $\pi/2$ phase-shifter 16 are operated under control of the controller 3 while the error detectors 6I, 6Q detect the error signals during the transmission timing period.

According to this transmitter-receiver, a distortion generated when the transmission signal is amplified by the transmission amplifier 11 can be eliminated by the amplitude-modulation in the signal-compensators 5I, 5Q. Specifically, when a transmission signal is transmitted by the transmission-system circuit composed of the circuit elements ranging from the baseband encoder 4 to the transmission amplifier 11, this transmission signal is received and processed by the mixers 15I, 15Q in the reception-system circuit. Upon transmission, although the antenna change-over switch 12 is connected to the transmission-system circuit to prevent the transmission signal from being directly supplied to the reception amplifier 14, the amplified output from the transmission amplifier is sufficiently high in level so that the transmission signal of sufficiently high level is input to the reception amplifier 14 even when the antenna change-over switch 12 is not connected to the reception-system circuit side.

The I-channel transmission signal and the Q-channel transmission signal processed by the mixers 15I, 15Q are compared with the transmission signal, which are not yet amplified by the transmission amplifier 11, by the error detectors 6Q, 6I. Differences from the error detectors 6I, 6Q are supplied to the signal-compensators 5I, 5Q as the error signals and fed back as the transmission signals, thereby the distortion generated when the transmission signal is amplified by the transmission amplifier 11 being eliminated. Therefore, according to the transmitter-receiver, even though the class-C amplifier with high efficiency which cannot avoid a distortion is used, the signal transmitted from the antenna 13 can be prevented from being affected by the distortion.

Since the reception-system circuit, which is not used during the transmission timing period inherently, is operated as the circuit for eliminating the distortion and the resultant reception signal is fed back to the transmission-system circuit, only the error detectors 6I, 6Q and the signal-compensators 5I, 5Q are required to eliminate the distortion. Therefore, a circuit for detecting a transmission signal is not needed and the distortion eliminating circuit can be realized by a simple circuit arrangement.

While the present invention is applied to the transmitter-receiver wherein the frequency of the transmission signal and that of the reception signal are equal to each other as described above, a principle of the present invention can also be applied to a transmitter-receiver wherein a frequency of a transmission signal and that of a reception signal are different from each other.

Figure 3:
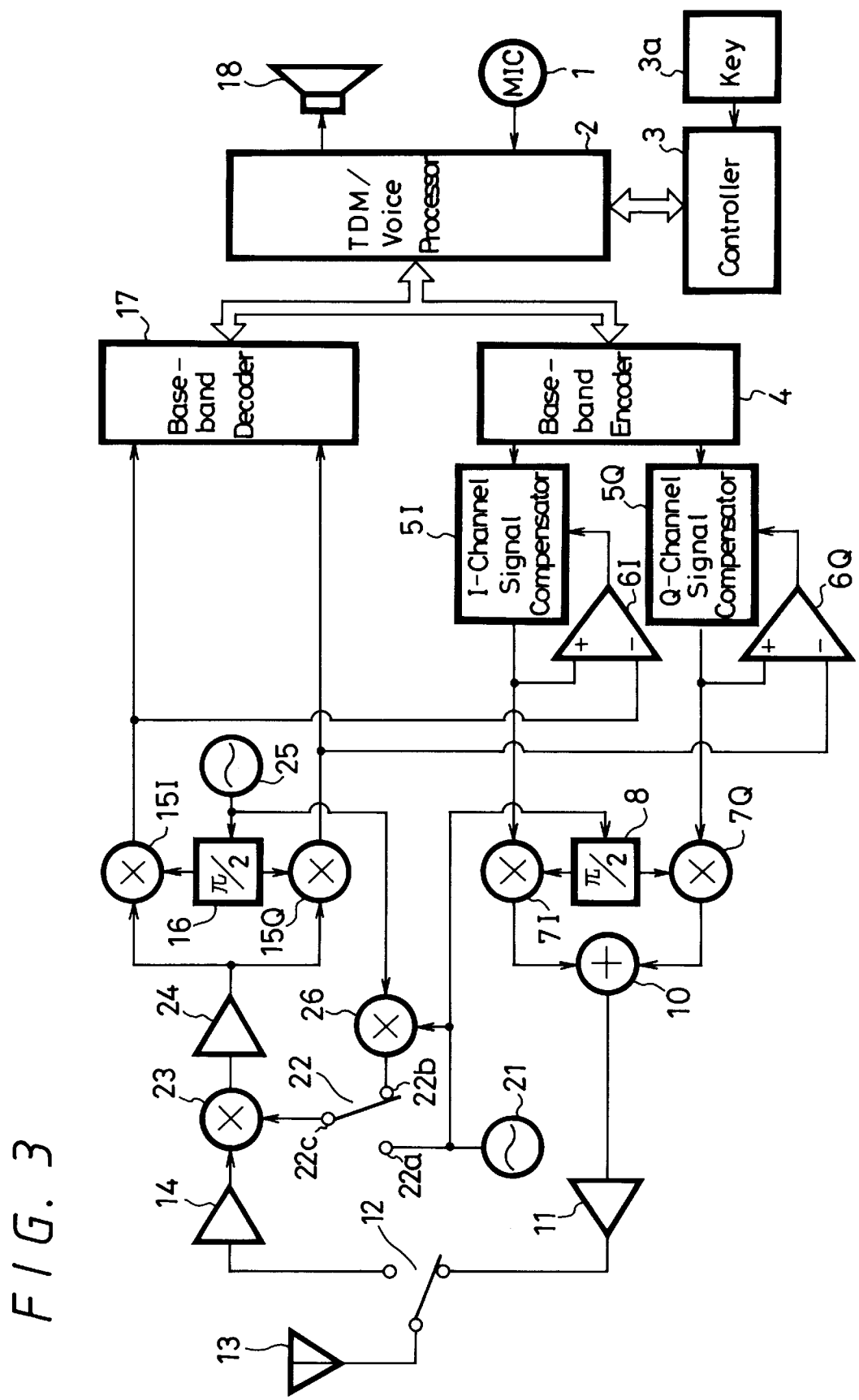
FIG. 3 is a block diagram showing a transmitter-receiver according to another embodiment of the present invention.

FIG. 3 is a block diagram showing a transmitter-receiver in which a frequency of a transmission signal and a frequency of a reception signal are different from each other. A transmission frequency is assumed to be 940 MHz and a reception frequency is assumed to be 840 MHz. In FIG. 3, like parts and elements corresponding to those of FIG. 2 are marked with the same references and therefore need not be described in detail.

As shown in FIG. 3, on the transmission side, I-channel and Q-channel baseband signals are frequency-converted into transmission frequencies of 940 MHz by mixers 7I, 7Q, each of which is an orthogonal modulator. On the reception side, reception signals of 810 MHz are frequency-converted into intermediate frequency signals of 130 MHz. Then, the intermediate frequency signals are frequency-converted into I-channel and Q-channel baseband signals by the mixers 15I, 15Q each of which is an orthogonal modulator.

In this transmitter-receiver, a first oscillator 21 with an oscillation frequency of 940 MHz and a second oscillator 25 with an oscillation frequency of 130 MHz are prepared as oscillators. An oscillation output from the first oscillator 21 with the oscillation frequency of 940 MHz is supplied to the $\pi/2$ phase-shifter 8. The I-channel and Q-channel baseband signals are frequency-converted into transmission signals with frequencies of 940 MHz by the mixers 7I, 7Q, each of which is an orthogonal modulator.

On the reception side, the reception signal from the antenna change-over switch 12 is amplified by the reception amplifier 14 and supplied to a mixer 23, in which it is multiplied with a signal selected by a change-over switch 22.

The frequency signal of 940 MHz is supplied to one fixed contact 22a of the change-over switch 22 and the frequency signal of 810 MHz is supplied to the other fixed contact 22b. More specifically, the oscillation output from the first oscillator 21 is directly supplied to one fixed contact 22a. A signal with a difference frequency, which results from multiplying the oscillation output from the first oscillator 21 and the oscillation output (130 MHz) from the second oscillator 25 by a mixer 26, is supplied to the other fixed contact 22b.

The change-over switch 22 is changed in position in unison with a transmission timing and a reception timing. Upon reception, the change-over switch 22 connects a movable contact 22c to the fixed contact 22a. Upon transmission, the change-over switch 22 connects the movable contact 22c to the fixed contact 22b.

The intermediate frequency signal, obtained by the multiplication in the mixer 23, is supplied through an intermediate amplifier 24 to the mixers 15I, 15Q, in which it is multiplied with a signal which results from phase-shifting the oscillation signal of 130 MHz output from the second oscillator 25 by the $\pi/2$ phase-shifter 16, thereby obtaining demodulated I-channel baseband signal and Q-channel baseband signal. Then, the demodulated I-channel baseband signal and Q-channel baseband signal are supplied to the baseband decoder 17 and the error detectors 6I, 6Q. A rest of arrangement is similar to that of the transmitter-receiver shown in FIG. 2.

Therefore, during the reception timing period, the frequency signal of 940 MHz is supplied to the mixer 23 in the reception-system circuit, in which it is multiplied with the reception signal of 810 MHz to provide an intermediate frequency signal of 130 MHz. The mixers 15I, 15Q each forming the orthogonal modulator demodulates the intermediate frequency signal of 130 MHz to provide the I-channel baseband signal and the Q-channel baseband signal.

During the transmission timing period, the frequency signal of 810 MHz is supplied to the mixer 23 in the reception-system circuit, in which the transmission signal of 940 MHz is multiplied with the signal amplified by the reception amplifier 14 and the frequency signal of 810 MHz to provide the intermediate frequency signal of 130 MHz. Then, the mixers 15I, 15Q demodulate the intermediate frequency signal of 130 MHz to provide the I-channel baseband signal and the Q-channel baseband signal.

Accordingly, since the output frequencies of the mixer 23 become the same during both the reception timing period and the transmission timing period, the intermediate frequency amplifier 24 is constantly operated properly to supply the intermediate frequency signal to the mixers 15I, 15Q.

The present invention can be applied to the transmitter-receiver in which the transmission frequency and the reception frequency are different by switching the switch 22 in unison with the antenna change-over switch 12. The transmitter-receiver shown in FIG. 3 also can eliminate the distortion of the transmission signal by the simple circuit arrangement similar to the transmitter-receiver shown in FIG. 2.

While the transmission frequencies and the reception frequencies are described by way of example, the present invention is not limited thereto and can also be applied to a transmitter-receiver which transmits and receives signal by use of other frequencies.

While the I-channel and Q-channel signal-compensators 5I, 5Q adjust the amplitudes of the I-channel signal and the Q-channel signal as described above, the I-channel and Q-channel signal-compensators 5I, 5Q may also adjust phases of the I-channel signal and the Q-channel signal in order to effect more precise compensation.

Further, while the present invention is applied to the transmitter-receiver of the modulation system in which the I-channel signal and the Q-channel signal are modulated by the DQPSK modulation system as described above, the present invention is not limited thereto and can also be applied to transmitter-receivers of other modulation systems.

While the present invention is applied to the portable radiotelephone device, the principle of the present invention can also be applied to a communication apparatus used for other purposes so long as a transmitter-receiver is the transmitter-receiver in which the transmission timing and the reception timing are different from each other.

The transmitter-receiver according to the present invention is of the transmitter-receiver of a communication system wherein the transmission timing period and the reception timing period are different from each other. Fundamentally, during the transmission timing period, the reception-system circuit need not be operated. However, according to the present invention, during the transmission timing period, the reception-system circuit is operated and the distortion of the transmission signal is detected by the reception-system circuit as the reception signal. Then, the difference between the reception signal and the transmission signal is fed back to the transmission signal, so that the distortion generated in the transmission signal is eliminated. Accordingly, the detecting circuit for detecting the distortion of the transmission signal can be composed of the detecting circuit for detecting the difference between the reception signal and the transmission signal and the circuit for feeding the detected difference back to the transmission signal. Therefore, the transmission signal distortion eliminating circuit can be arranged by a simple circuit arrangement. Therefore, according to the present invention, even when the amplifier with much distortion is used as the transmission amplifier, it is possible to eliminate the distortion by the simple circuit arrangement.

When the transmission frequency in which the transmission signal is converted by the transmission frequency-converting circuit and the reception frequency in which the reception frequency is obtained by the reception frequency-converting circuit are different from each other, if the frequency at which the reception signal is obtained by the reception frequency-converting circuit is switched during the transmission timing period and the reception timing period, the inherent reception processing at the reception timing period and the transmission signal receiving processing at the transmission timing period can be properly carried out, respectively.

Furthermore, since the I-component signal and the Q-component signal are orthogonally modulated with a predetermined phase difference when the transmission signal is frequency-converted by the transmission frequency-converting circuit, the distortion of the orthogonally-modulated transmission signal can be eliminated satisfactorily. There is then the small possibility that the phase of the transmission signal will be detected erroneously on the reception side. As a consequence, the occurrence of error in the reception signal can be reduced.

Having described preferred embodiments of the invention with reference to the accompanying drawings, it is to be understood that the invention is not limited to those precise embodiments and that various changes and modifications could be effected therein by one skilled in the art without departing from the scope of the invention as defined in the appended claims.

What is claimed is:

1. A transmitting-receiving apparatus employing an antenna and comprising:

control means;

data processing means controlled by said control means for processing transmitted data and received data so as to be communicated at different timings;

a transmission-system circuit having an encoder for producing a transmission baseband signal from the transmitted data supplied thereto from said data processing means;

modulating means for producing a transmitted signal by modulating said transmission baseband signal from said transmission-system circuit;

a power amplifier for amplifying said transmitted signal;

a reception-system circuit having demodulating means for producing a reception baseband signal by demodulating a received signal;

a decoder for producing said received data from said reception baseband signal; and switch means controlled by said control means for selectively connecting said transmission-system circuit or said reception-system circuit to the antenna, wherein said switch means comprises a first and a second switch and said modulating means has a first oscillator for providing a frequency of said transmitted signal, said demodulating means has a second oscillator for providing a frequency equal to a difference between the frequency of said transmitted signal and a frequency of said received signal, a first mixer for mixing an output supplied thereto from said first oscillator and an output supplied thereto from said second oscillator, a second mixer coupled between said first switch and said demodulating means, and said second switch switches the output of said first oscillator to said second mixer when said first switch connects said reception-system circuit to said antenna and switches an output of said first mixer to said second mixer when said first switch connects said transmission-system circuit to said antenna.

* * * * *